(12) United States Patent
Cheney et al.

(10) Patent No.: US 6,663,117 B2
(45) Date of Patent: Dec. 16, 2003

(54) TRACKED BICYCLE

(75) Inventors: Dennis A. Cheney, 1771 E. Cedar, Eagle Mountain, UT (US) 84043; Spencer Magleby, Provo, UT (US); Aaron Moulton, Lehi, UT (US); Chris Mattson, Troy, NY (US); Chad Lasson, Salt Lake City, UT (US); Ryan Larsen, Provo, UT (US); Kirk Larson, Salt Lake City, UT (US); Rich Bennion, Dublin, OH (US); Eric Norby, Albuquerque, NM (US); Gary Evans, Sacramento, CA (US)

(73) Assignees: Dennis A. Cheney, Eagle Mountain, UT (US); Janice R. Cheney, Eagle Mountain, UT (US); Noah M. Cheney, Eagle Mountain, UT (US); Adam M. Cheney, Eagle Mountain, UT (US)

( * ) Notice: Subject to any disclaimer, the term of this patent is extended or adjusted under 35 U.S.C. 154(b) by 99 days.

(21) Appl. No.: 10/020,658

(22) Filed: Oct. 29, 2001

(65) Prior Publication Data

US 2003/0080522 A1 May 1, 2003

(51) Int. Cl.$^7$ .................................................. B62B 9/04
(52) U.S. Cl. ............................... 280/12.14; 280/12.13; 280/14; 280/12.1
(58) Field of Search ........................... 280/12.13, 12.14, 280/12.1, 13, 14, 21.1, 22, 22.1; 180/9.21, 9.25, 9.28, 190, 182, 183

(56) References Cited

U.S. PATENT DOCUMENTS

| | | | |
|---|---|---|---|
| 526,556 A | * 9/1894 | Bolton | 280/12.1 |
| 541,426 A | 6/1895 | Detreux | |
| 654,291 A | 7/1900 | Stith | |
| 1,261,204 A | * 4/1918 | Barton | 280/12.14 |
| 1,281,980 A | * 10/1918 | Kostewich | 280/7.14 |
| 1,318,166 A | * 10/1919 | Matheus | 280/12.1 |
| 3,336,994 A | 8/1967 | Pederson | |
| 3,592,279 A | 7/1971 | Donelson | |
| 3,872,938 A | 3/1975 | DeGroot | |
| 3,915,468 A | 10/1975 | Hoareau | |
| 4,699,229 A | 10/1987 | Hirose et al. | |
| 4,719,983 A | 1/1988 | Bruzzone | |
| 4,823,903 A | 4/1989 | Bibollet et al. | |
| 5,102,153 A | 4/1992 | Rhode | |
| 5,423,559 A | 6/1995 | Rhode | |
| 5,738,361 A | * 4/1998 | Landucci | 280/12.14 |
| 5,904,217 A | * 5/1999 | Yamamoto et al. | 180/193 |
| 6,123,353 A | * 9/2000 | Bennett et al. | 280/281.1 |
| 6,164,670 A | 12/2000 | Abarca et al. | |
| 6,361,032 B1 | * 3/2002 | Lawson | 267/158 |
| 6,431,570 B1 | * 8/2002 | Lennon et al. | 280/204 |
| 6,511,079 B1 | * 1/2003 | Charles, Sr. | 280/12.14 |

* cited by examiner

Primary Examiner—Brian L. Johnson
Assistant Examiner—Brian L. Swenson
(74) Attorney, Agent, or Firm—Thorpe North & Western LLP

(57) ABSTRACT

A tracked vehicle (18), or a kit (10) for converting a standard bicycle (14) into a tracked cycle, includes a track assembly (22) with a bogie assembly (84) for riding on snow, mud, sand, etc. The track assembly includes a continuous track (60) movably disposed about a drive wheel (64) coupled to a frame (34) of the vehicle or bike, and a bogie wheel (68) disposed rearward of the drive wheel. The bogie assembly includes a compliant and resilient arm (80) coupling the bogie wheel to the frame of the vehicle or bike. The arm exerts a force against the bogie wheel, which forces the track towards the riding surface.

39 Claims, 5 Drawing Sheets

TRACKED BICYCLE

BACKGROUND OF THE INVENTION

1. Field of the Invention

The present invention relates generally to tracked vehicles. More particularly, the present invention relates to a tracked bicycle for use on snow, sand, mud, etc.

2. Related Art

Mountain biking, off-road bicycling, and/or bicycling in and around nature have become popular sports or pastimes. Bikers or cyclists often enjoy riding in wilderness or natural environments, such as the woods, sand dunes, red-rocks, etc. Such environments can provide a welcome change from city or suburban environments. In addition, such environments can provide unique and challenging riding conditions, including steep uphill climbs, steep downhill descents, sharp curves, etc. Some wilderness or natural environments are provided with bike trails. Such trails can be simple paths in the dirt or sand, while others can be graded or covered with gravel, while still others may be paved. Another unique and challenging riding condition of the wilderness or natural environments is obstacles, such as larger rocks, fallen tree trunks, streams and rivers, mud, sand dunes, etc. These natural conditions provide additional enjoyment and challenge to the cycling experience.

Such bicycling or cycling is often dependent on weather conditions, or seasons. While some areas or locations allow for year-round riding, other areas can be limited to the spring, summer and fall months. For example, many popular riding areas are located in the mountains, where annual winter snowfall prohibits riding off-road or on non-maintained trails. In addition, it will be appreciated that most maintained roads are for motor vehicles, and that sharing a road with such motor vehicles in winter conditions can be extremely dangerous. Therefore, even the most ardent mountain bikers tend to store their bikes for the winter and opt for either in-door stationary bicycles, alternative winter sports such as snowshoeing or cross-country skiing, or simple waiting out the winter.

Some efforts have been made to continue mountain biking in the winter. For example, bicycles have been proposed with "fat" or wide tires to prevent sinking into the snow. Such bicycles have special, wide frames to accommodate the fat or wide tires. Thus, the rider must invest in another bicycle with this approach. As another example, standard mountain bikes have been proposed with special tires that have spikes or studs. Such tires tend to be thin enough to sink into the snow. As a further example, devices have been proposed with a seat disposed on front and rear skis. Such devices, however, are suitable only for coasting down a slope, and are not provided with any means of propulsion.

Various tracked, off-road, recreational vehicles have been proposed. Such vehicles have a continuous track, similar to tank tracks, as opposed to, or in addition to, wheels. While some tracks have been used for motor powered vehicles, such as all-terrain-vehicles (ATVs), it is not readily apparent how to adapt such tracks for use with human-powered vehicles, such as bicycles. Some tracks have been proposed for use with human-powered vehicles, but are cumbersome, awkward, and require special modifications to the bicycle.

In addition, other areas or locations have riding conditions for which typical mountain bikes are ill suited. For example, mud and sand can be as difficult to ride in as snow. Tires tend to slip and spin in both mud and sand. In addition, the tires can sink into both mud and sand.

SUMMARY OF THE INVENTION

It has been recognized that it would be advantageous to develop a bicycle capable of being realistically operated in conditions or environments such as snow, mud, sand, etc. In addition, it has been recognized that it would be advantageous to develop a bicycle with improved traction and buoyancy with respect to the riding surface. In addition, it has been recognized that it would be advantageous to develop a bicycle which can be operated in different conditions, or which can be easily converted for use in different conditions, such as both hard dirt and snow.

The invention provides a tracked vehicle, or a kit for converting a standard bicycle into a tracked vehicle, with improved traction and buoyancy characteristics on certain soft riding surfaces, such as snow, mud, sand, etc. The vehicle or bicycle can have a frame with a rear fork (or rear stays), a rear axle location, and a drive assembly. The kit advantageously allows a standard bicycle to be configured as both a wheeled vehicle, and a tracked vehicle.

The vehicle or kit advantageously includes a track assembly with a continuous track movably disposed around a drive wheel and a bogie wheel. The drive wheel is coupled to the frame or rear fork at the rear axle location. The bogie wheel of the track is disposed rearward of the drive wheel, and maintains the track against the riding surface.

In addition, the vehicle or kit advantageously includes a bogie apparatus to bias the bogie wheel and the track against the riding surface. One or more compliant and resilient arms advantageously are operatively coupled to the frame and the bogie wheel. The arm couples the bogie wheel to the frame, and exerts a predetermined force against the bogie wheel, and thus the track. The arm can include a composite material, such as fiberglass, and can form a spring member that couples the bogie wheel to the frame in a cantilever configuration.

Preferably, the bogie wheel is movable with respect to the frame, and pivots with respect to the frame. The arm bends as the bogie wheel moves or pivots. The bogie wheel and the continuous track can have an initial position with respect to the frame on a flat riding surface, while the arm is bent into a curved configuration to bias the bogie wheel and continuous track towards the riding surface, so that the arm is pre-loaded.

In accordance with one aspect of the present invention, the vehicle or kit includes a ski coupled to the frame or a front fork of the frame.

In accordance with another aspect of the present invention, the track assembly advantageously can include a tensioner to maintain tension on the continuous track. The tensioner can include a bogie bracket attached to the flexible arm opposite the frame. A pivot bar has a first end pivotally attached to the bogie bracket, and a second end coupled to the bogie wheel. The pivot bar is pivotal towards and away from the frame, but biased away from the frame to maintain tension on the track. For example, a spring can be coupled to and between the bogie bracket and the pivot bar to pull the pivot bar away from the frame and tension the track.

In accordance with another aspect of the present invention, the vehicle has at least two configurations, including a wheeled configuration and a tracked configuration. In the wheeled configuration, a rear wheel is coupled to the rear fork, and the track assembly is uncoupled from the frame. In addition, a front wheel can be coupled to the front fork, and the ski can be uncoupled from the front fork. In the tracked configuration, the track assembly is coupled to the frame, and the rear wheel is uncoupled from the rear fork. In addition, the ski can be coupled to the front fork, and the front wheel uncoupled form the front fork.

Additional features and advantages of the invention will be apparent from the detailed description which follows, taken in conjunction with the accompanying drawings, which together illustrate, by way of example, features of the invention.

DETAILED DESCRIPTION

Figure 1:
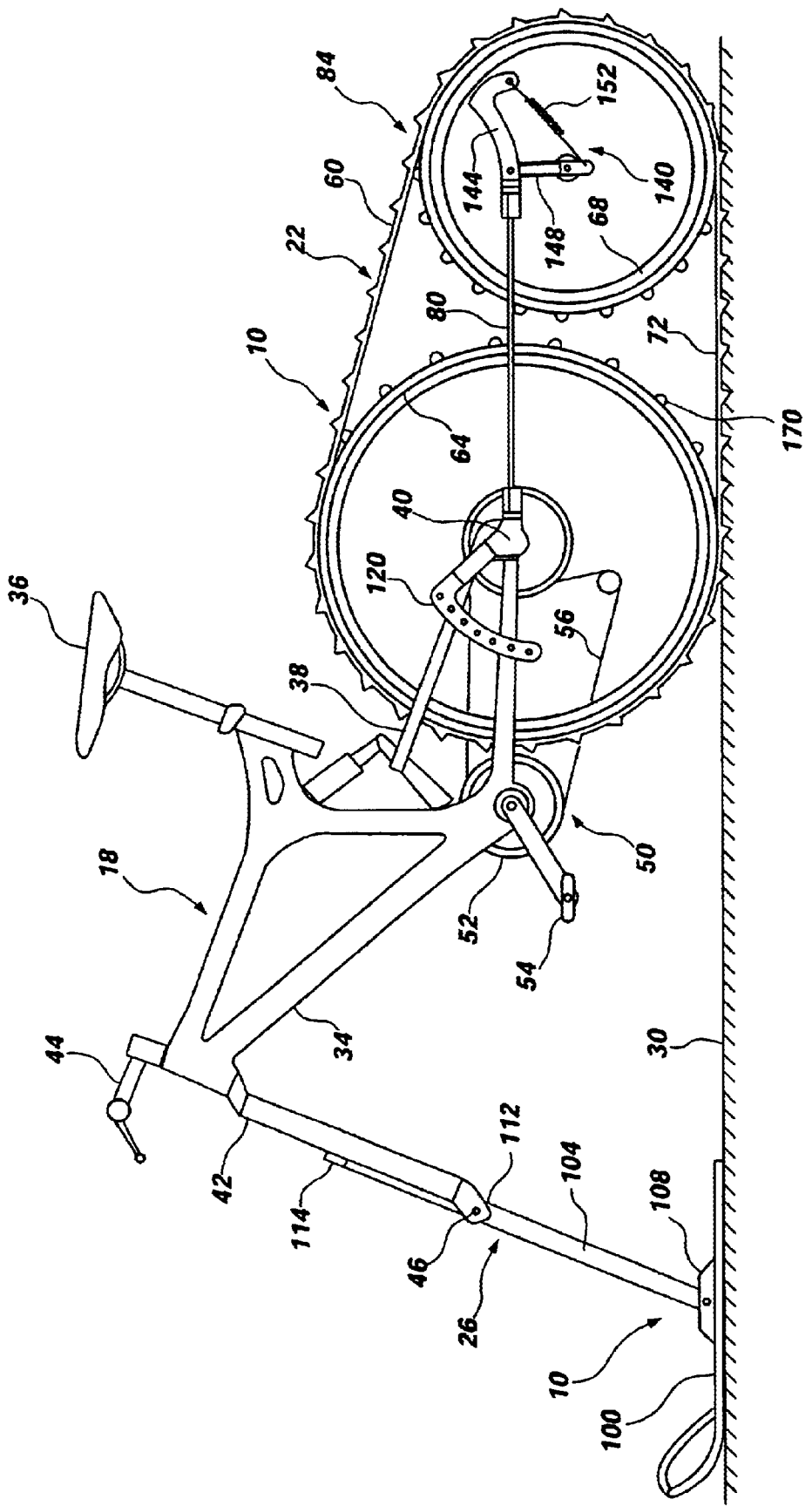
FIG. 1 is a side view of a standard bicycle with a kit having a track assembly and front ski in accordance with the present invention installed thereon to form a tracked vehicle in accordance with the present invention.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

As illustrated in FIG. 1, a kit 10 in accordance with the present invention is shown installed on a standard bicycle 14 (FIG. 7) to convert it into a tracked cycle or tracked vehicle 18. Mountain bikes, mountain biking, bicycles, cycling and human-powered vehicles are examples of fields that may benefit from the use of such a kit 10 or tracked vehicle 18. The kit 10 can include a track assembly 22 and a ski assembly 26 that advantageously can be installed on the standard bicycle 14 (FIG. 7) to create a tracked vehicle 18 with improved traction and/or buoyancy on a riding surface 30, such as snow, mud, sand, etc. Thus, the performance or function of a standard bicycle or human powered vehicle can be improved for certain riding conditions, enhancing or extending the riding experience. In addition, the kit 10 allows a user or rider to use a single vehicle or bicycle for both wheeled and tracked applications.

While the kit 10 of the present invention is shown and configured for use with a standard bicycle, it is of course understood that the kit can be configured for use with other types of human-powered vehicles, or bicycles with different configurations, such as recumbent bicycles or different frame configurations. In addition, it is understood that while the kit is shown and configured for use with human-powered vehicles, it can be configured for used with powered or motor vehicles. Furthermore, it is understood that while the kit, or track and ski assemblies, are shown as accessories for being removably coupled to a standard bicycle, the track and/or ski assemblies can be permanently or integrally provided on a vehicle to form a dedicated tracked vehicle.

Figure 7:
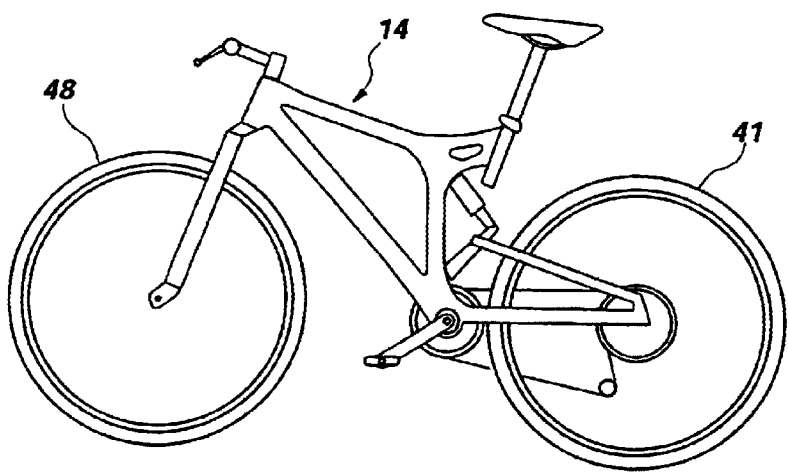
FIG. 7 is a side view of a standard bicycle.

Referring to FIGS. 1 and 7, the bicycle 14 or tracked vehicle 18 preferably has a frame 34 with a seat 36 to support a rider and a rear fork (or rear stays) 38. The rear fork 38 can have a rear axle location 40 where a rear wheel 41 (FIG. 7) can be rotatably coupled to the frame 34. Preferably, a front fork 42 is pivotally coupled to the frame 34, and attached to a handlebar 44 for a user to grasp and pivot the front fork 42. The front fork 42 also can have a front axle location 46 where a front wheel 48 (FIG. 7) can be rotatably coupled to the front fork 42 or frame 34. A drive assembly 50 can be coupled to the frame 34, and can include a peddle gear 52 rotatably coupled to the frame 34, peddles 54 attached to the peddle gear 52 to allow a rider to rotate the peddle gear, and a drive chain 56 operative disposed around the peddle gear 52 to transfer the rotation and/or force of the peddles gear.

Figure 2:
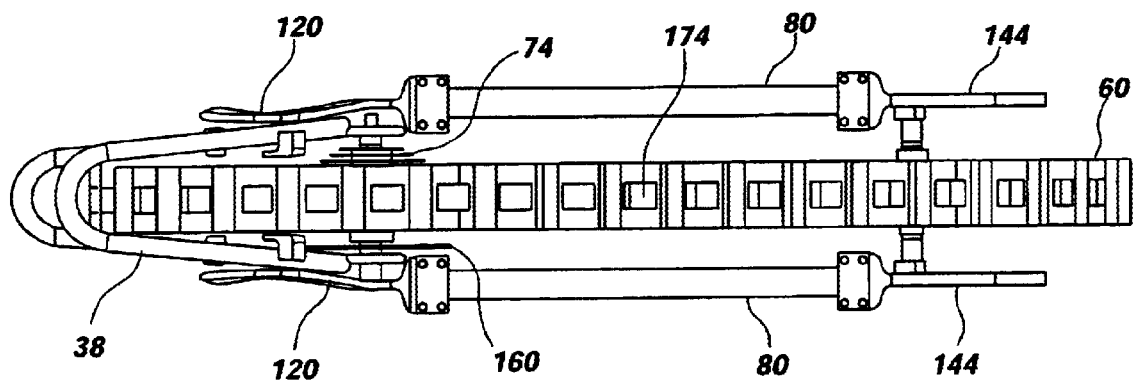
FIG. 2 is a top view of the track assembly of FIG. 1.

Referring to FIGS. 1 and 2, the track assembly 22 includes a continuous track 60 movably disposed around a pair of opposite, spaced-apart wheels, including a drive wheel 64 and a bogie wheel 68. The drive wheel 64 turns or drives the track 60, while the bogie wheel 68 allows an elongated portion 72 of the track 60 to contact the riding surface 30. The elongated portion 72 of the track 60 increases the surface area of the track 60 contacting the riding surface 30 to improve traction and buoyancy. As discussed in greater detail below, the bogie wheel 68 advantageously is flexibly and resiliently coupled to the frame 34 or drive wheel 64, and biased towards the riding surface 30, to improve traction. Preferably, the track assembly 22 is removably coupled to the frame 34 so that the track assembly can be selectively coupled and uncoupled from the frame 34. Thus, the track assembly 22 can be selectively coupled to the frame 34 to convert the standard bicycle 14 (FIG. 7) into the tracked cycle or vehicle 18.

The track 60 can be formed of a flexible material so that it can travel around the drive and bogie wheels 64 and 68. Protrusions can extend outwardly from the track 60 to increase traction or prevent slippage of the track with respect to the riding surface 30. The track 60 can be an integral, continuous loop, or can be separable. The track 60 preferably has a width sized to extend substantially across the available width between the rear fork 38. Thus, the track 60 can be utilized with a standard bicycle 14 (FIG. 7), and maximize surface area and buoyancy on the riding surface 30, such as snow.

The drive wheel 64 is rotatably coupled to the frame 34 or rear fork 38. Preferably, the drive wheel 64 is removably coupled to the frame 34 or rear fork 38 so the drive wheel 64 can be selectively coupled and uncoupled from the frame. In addition, the drive wheel 64 preferably is coupled at the rear axle location 40 of the rear fork 38, or has a drive axle coupled at the rear axle location, much like a typical rear wheel. The drive wheel 64 can have one or more drive gears 74 (FIG. 2) that are operatively engaged by the drive chain 56 such that a rider peddling the peddles 54 drives the drive wheel 64 through the peddle gear 52 and drive chain 56.

Coupling the drive wheel 64 at the rear axle location 40 advantageously allows the drive assembly 50 of a standard bicycle to also drive the drive wheel 64.

The bogie wheel 68 preferably is disposed rearward of, and spaced-apart from, the drive wheel 64. One or more flexible and resilient arms 80 advantageously couple the bogie wheel 68 to the frame 34. Preferably, a pair of arms 80 is coupled to and between the frame 34 and the bogie wheel 68, each one on an opposite side of the bogie wheel. The arms 80 have a first end attached to the frame 34, and a second end coupled to the bogie wheel 68. Thus, the bogie wheel 68 is attached to the frame 34 in a cantilever configuration. The bogie wheel 68 and arms 80 form a bogie assembly or apparatus 84 for use with the track 60 or track assembly 22 of the tracked vehicle 18.

Figure 3:
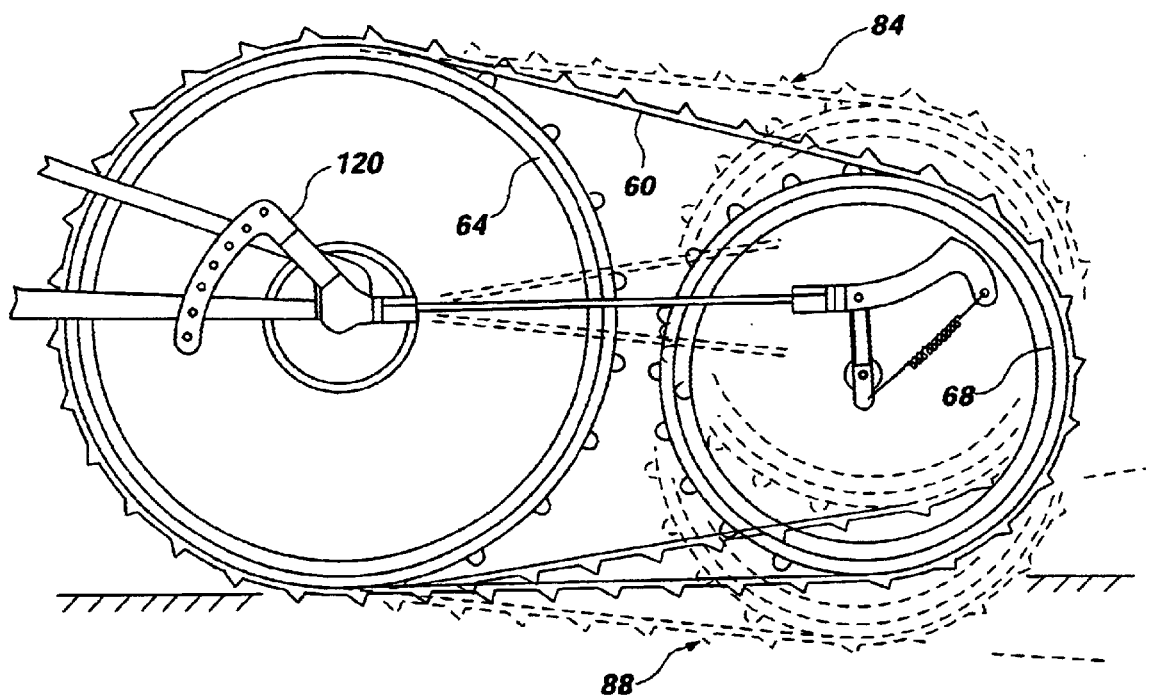
FIG. 3 is a side view the track assembly of FIG. 1 showing multiple positions of the track assembly.

Referring to FIG. 3, the arms 80 are compliant and resilient to allow the bogie wheel 68 to move or pivot with respect to the frame 34. Thus, the bogie wheel 68 can move upward or downward in response to the riding surface 30, or riding conditions. For example, the bogie wheel 68 and track 60 can displace upwardly, indicated at 84 by dashed lines. In addition, the arms 80 exert a force against the bogie wheel 68, and thus the track 60, to force the track 60 against the riding surface 30 to improve traction. For example, in softer snow, the bogie wheel 68 and track 60 can deflect downwardly, indicated at 88 by dashed lines, to maintain contact with the snow as it compresses. The arms 80 bend or deflect as the bogie wheel 68 moves or pivots.

Figure 4:
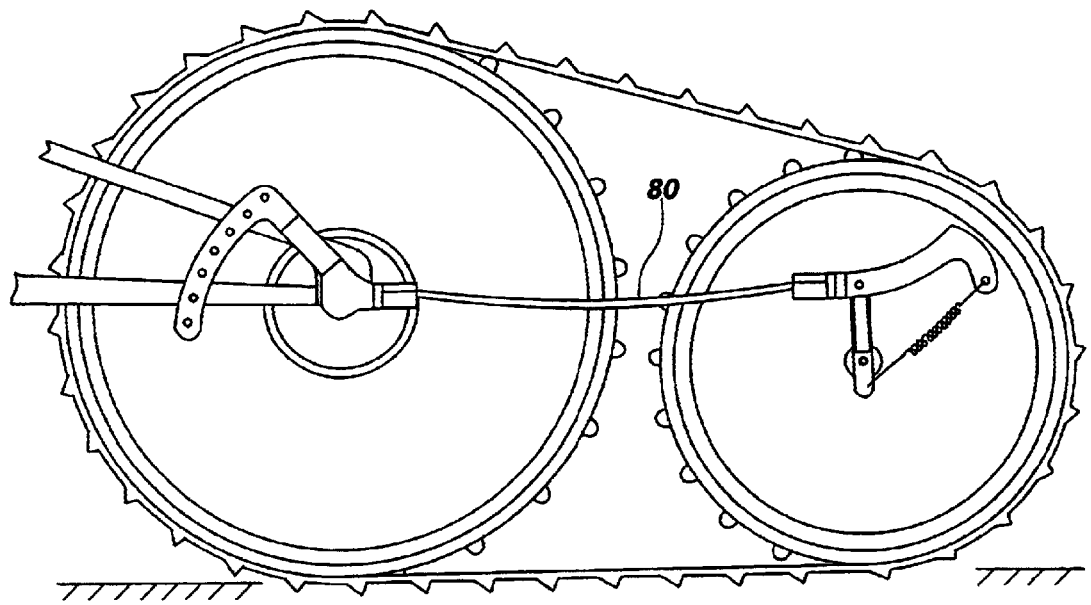
FIG. 4 is a side view of the track assemble of FIG. 3.

Referring to FIG. 4, the arms 80 can be pre-loaded to exert a predetermined amount of force against the bogie wheel 64. Thus, the track 60 exerts a predetermined amount of force against the riding surface 30. The arms 80 preferably exert a force when the track assembly 22 or bogie wheel 64 is in a normal configuration or position, such as when the track assembly 22, or lower portion 72 thereof, and the ski align on a flat riding surface. Thus, the arms 80 can be bent to exert a force in the normal configuration. It has been determined that the arms preferably exert approximately 5–25 pounds of force for approximately 1–3 inches of deflection.

The arms 80 preferably are formed of a flexible and resilient material. Thus, the arms 80 form springs or bows, attaching the bogie wheel 64 to the frame 34. In one aspect, the arms 80 are composite arms formed of a composite material, such as pultruded fiberglass. For example, the compliant arms 80 may be formed of 1.25"×0.25" bars of pultruded fiberglass. The pultruded fiberglass can include glass fibers densely packed and embedded in a polyester resin. In one aspect, the material of the arms 80 has a modulus of elasticity between approximately 3 and 6 Msi; more preferably between approximately 3 and 5 Msi; and most preferably between approximately 3 and 4 Msi. It is of course understood that such specifications are dependent on the specific dimensions of the arm.

In addition to the track assembly 22, the kit 10 also preferably includes a ski assembly 26. The ski assembly 26 preferably is removably coupled to the front fork 42. The ski assembly 26 includes a ski 100 coupled to the front fork 42. An elongated ski post 104 can be removably attachable to the front fork 42, and extend to a connector 108 on a lower end thereof to pivotally couple to the ski 100. The ski post 104 can include a lower mounting bracket 112 attachable to the front axle location 46 of the front fork 42, and an upper mounting bracket 114 attachable to the front fork 42, or to a brake location of the front fork. The ski post 104 allows the front fork of a standard bicycle to be used with the ski 100.

Figure 5:
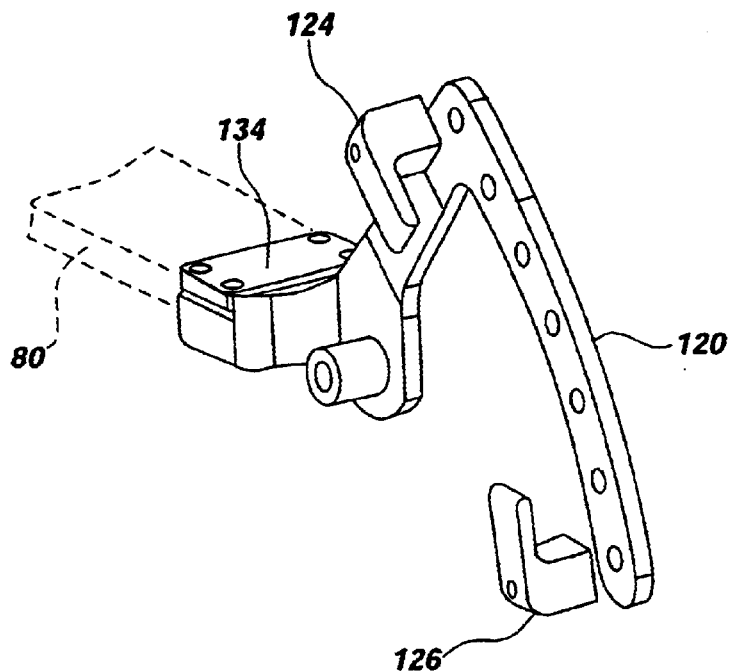
FIG. 5 is a perspective view of a bracket in accordance with the present invention for attaching the track assembly or a bogie wheel to the bicycle.
Figure 6:
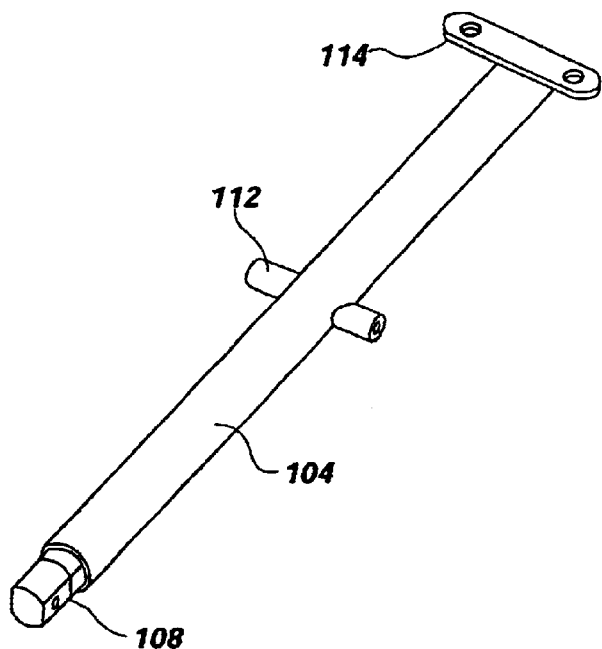
FIG. 6 is a perspective view of a ski post in accordance with the present invention for attaching a ski to a front fork of a bicycle.
Figure 8:
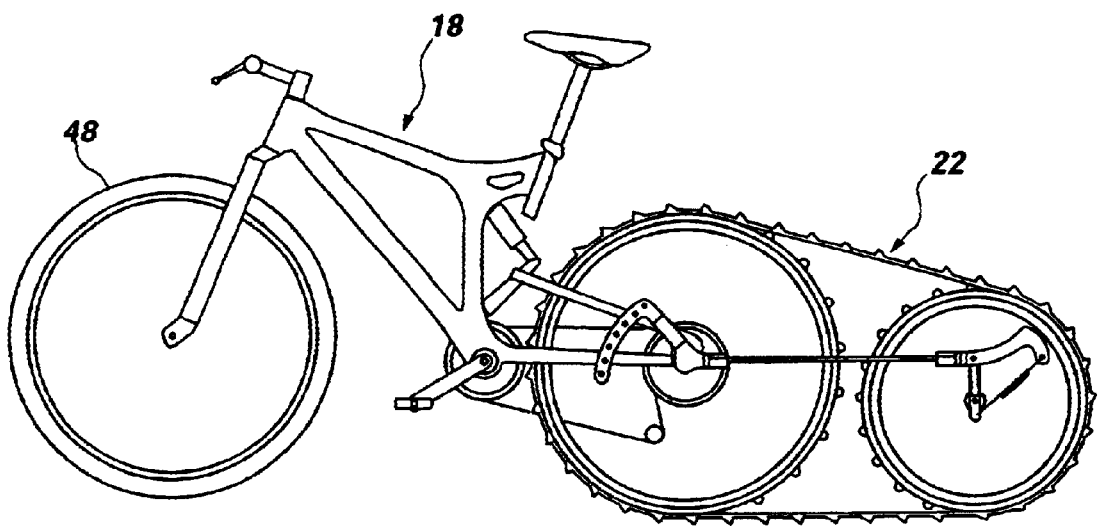
FIG. 8 is a side view of the standard bicycle of FIG. 7 with a track assembly in accordance with the present invention installed thereon to form a tracked vehicle in accordance with the present invention.
Figure 9:
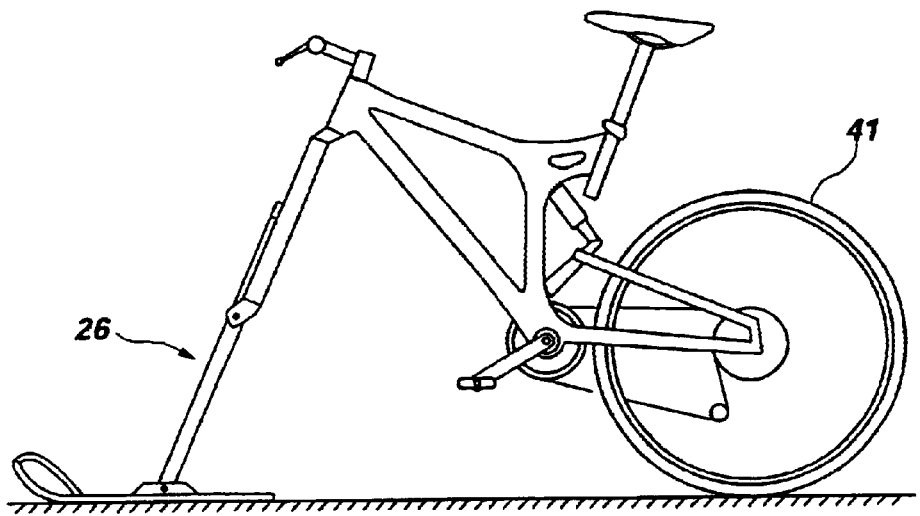
FIG. 9 is a side view of the standard bicycle of FIG. 7 with a ski assembly in accordance with the present invention installed thereon to form a skied vehicle in accordance with the present invention.

Referring to FIGS. 1 and 5, the track assembly 22 can be attached to the frame in any appropriate manner. As an example, a universal bracket can be used which is configured to removably attach the track assembly 22 to a number of different frame configurations, or rear fork configurations. One or more frame brackets 120 can have a vertically oriented portion to be disposed adjacent the rear fork 38. One or more braces, such as upper and lower braces 124 and 126, can be adjustably attached to the frame bracket 120 to clamp the rear fork 38 between the braces 124 and 126 and the bracket 120. The upper brace 124 can clamp an upper member of the rear fork 38 to the bracket 120, while the lower brace 126 can clamp a lower member of the rear fork 38 to the bracket 120. As shown, the frame bracket 120, or vertically oriented portion thereof, can be elongated to extend across the rear fork 38 of different frame configurations. In addition, the braces 124 and 126 can be selectively secured along the bracket 120, such as along a plurality of holes, to adjust for different frame configurations. A hole 130 can be formed in the bracket 120 to receive the axle of the drive wheel 64.

The arms 80 can be attached directly to the brackets 120, thus coupling the bogie wheel 68 to the brackets 120 and the frame 34. The first ends of the arms 80 can be attached to a horizontal portion of the brackets 120, such as by clamping between the bracket 120 and a clamp plate 134.

The drive wheel 64 can be attached directly to the rear fork 38 of the frame 34. Preferably, the drive wheel 64 is located at the rear axle location 40, similar to the standard rear wheel 41 (FIG. 7), so that the drive wheel 64 can be coupled to the drive chain 56 without further modification of the drive assembly 50. Alternatively, the drive wheel 64 can be attached to the bracket 120 so that the entire track assembly 22 can be attached and removed as a unit.

Referring to FIGS. 1 and 4, the track assembly 22 or the bogie assembly 84 can include a tensioner or tension mechanism 140 to maintain tension on the track 60 between the drive and bogie wheels 64 and 68. The tensioner 140 can movably couple the bogie wheel 68 to the arms 80. Thus, the tensioner 140 can move the bogie wheel 68 away from the drive wheel 64 as the bogie wheel 68 pivots with respect to the frame. It will be appreciated that as the bogie wheel 68 pivots with respect to the frame, the arms 80 cause the bogie wheel 68 to move slightly closer to the frame, thus decreasing tension on the track 60. The tensioner 140 moves the bogie wheel 68 away from the frame to maintain tension.

For example, the tensioner 140 can include a bogie bracket 144 attached to the second end of the arm 80 opposite the frame or frame bracket. A pivot bar 148 has a first end pivotally attached to the bogie bracket 144 so that the pivot bar pivots with respect to the bogie bracket 144 towards and away from the bogie bracket, and pivots towards and away from the frame. The bogie wheel 68 is coupled to the second end of the pivot bar 148 so that the bogie wheel 68 is movable with respect to the bogie bracket 144, and thus the arms 80. The bogie wheel 68 is biased away from the frame. A spring 152 is coupled between the bogie bracket 144 and the pivot bar 148. The spring can extend from a protrusion on the bogie bracket, which extends away from the frame, and the second end of the pivot bar. Thus, the spring 152 pulls the pivot bar 148 and the bogie wheel 68 away from the frame and tensions the track 60.

The tracked vehicle 18 preferably has two or more configurations, including a wheeled configuration, as shown in FIG. 7, and a tracked configuration, as shown in FIG. 1.

Referring to FIG. 7, the vehicle can be a standard bicycle 14. The rear wheel 41 is coupled to the rear fork 38 at the rear axle location 40, and coupled to the drive chain 56 of the drive assembly 50. In addition, the front wheel 48 preferably is coupled to the front fork 42 at the front axle location 46.

Referring to FIG. 1, in the tracked configuration, the track assembly 22 is coupled to the frame 34 or rear fork 38, preferably at the rear wheel location 40. The drive chain 56 of the drive assembly 50 is operatively coupled to drive wheel 46. In addition, the ski 100 or ski assembly 26 preferably is coupled to the front fork 42.

It will be appreciated that the other configurations are possible. For example, referring to FIG. 8, the tracked assembly 22 can be coupled to the rear fork 38, and the front wheel 48 can be coupled to the front fork 42. Such a configuration can be useful for riding in mud or sand. As another example, referring to FIG. 9, the ski assembly 26 can be coupled to the front fork 42, and the rear wheel 41 can be coupled to the rear fork 38. Such a configuration can be useful in other riding conditions. Thus, the kit 10 of the present invention advantageously is capable of providing multiple different vehicle configurations, as shown in FIGS. 1 and 7-9.

It will be appreciated that the standard brakes associated with the standard bicycle 14 (FIG. 7) can be removed or may be inoperable for the tracked vehicle 18 or the tracked configuration. Thus, referring to FIG. 2, the track assembly 22 can include a disk brake 160 attached to the drive wheel 64 to provide braking. The tracked vehicle 18 can utilize a hydraulic brake which engages the disk brake 160.

Referring to FIGS. 1 and 2, the drive wheel 64 can have a plurality of teeth or protrusions 170 formed thereon which mate with a plurality of apertures 174 formed in the track 60. The teeth and apertures 170 and 174 resist slipping between the drive wheel 64 and track 60. Alternatively, teeth can be formed on the track to mate with indentations in the drive wheel. Similar teeth can be formed in the bogie wheel 68. The teeth 170 preferably have an involute profile in which the profile of the teeth 170 curve inwardly near the tip. The involute profile of the teeth 170 advantageously allows the track 60 or apertures 174 to follow the profile of the teeth 170, and thus promote proper seating between the track 60 and the teeth 170. In addition, the teeth 170 and apertures 174 laterally maintain the track 60 on the wheels 64 and 68.

While a separate drive wheel 64 has been described, it will be appreciated that the rear wheel 41 of the standard bicycle 14 can be configured as the drive wheel 64. In addition, the drive wheel 64 can have a plurality of different sized gears, similar to the rear wheel 41. Furthermore, either of the drive or bogie wheels 64 and 68 can have any appropriate configuration, such as multiple wire spokes extending from the axle to the rim, a few composite spokes, a single, solid disc spoke, etc.

A method for converting the standard bicycle 14 (FIG. 7) into a tracked cycle 18 (FIG. 1) includes removing the standard rear wheel 41 (FIG. 7) from the rear fork 38, and from the drive chain 56. The standard rear brakes (not shown) also may be removed from the rear fork 38. The track assembly 22 is coupled to the frame 34 or rear fork 38. The drive wheel 64 is coupled to the rear fork 38, preferably at the rear axle location 40, and operatively coupled to the drive chain 56, such as by looping the drive chain 56 around one of the gears on the drive wheel 64. The drive wheel 64 can have an axle that is secured to the rear fork 38 with a threaded rod and nuts, similar to the rear wheel 41. Preferably, the track 60 is looped about the drive wheel 64 prior to attachment to the rear fork 38. Alternatively, if the track is separable, the track can be looped around the wheels later. The arms 80 are secured to the rear fork 38 or frame 34. For example, the frame bracket 120 can be positioned adjacent the rear fork 38, and the upper and lower braces 124 and 126 (FIG. 5) located adjacent respective upper and lower portions of the rear fork 38. The upper and lower braces 124 and 126 can be secured to the frame bracket 120 to secure the rear fork 38 therebetween.

The track 60 can be looped about both the drive and bogie wheels 64 and 68. The teeth 170 are mated with the apertures 174 (FIG. 2) in the track 60. The tensioner 140 can be held or disengaged while the track 60 is looped about the wheels 64 and 68. After the track 60 is positioned, the tensioner 140 can be released or engaged to tension the track.

A hydraulic brake (not shown) can be attached to the frame 34 or handlebars 44 to engage the disc brake 160 (FIG. 2) on the drive wheel 64.

In addition, the standard front wheel 48 (FIG. 7) can be removed from the front fork 42 and replaced with the ski assembly 26. The standard front brake (not shown) also can be removed. The ski 100 can be coupled to the front fork 42 with the ski post 104. The lower mounting bracket 112 can be attached to the front axle location 46 similar to the front wheel, or with a threaded rod and nuts. The upper mounting bracket 114 can be attached to the front fork 42 above the lower mounting bracket 112, such as to the front brake location.

It will be appreciated that the kit 10 or track assembly 22 allows a standard bicycle 14 (FIG. 7) to be quickly and easily converted into a tracked vehicle 18. The kit 10 or track assembly 22 allows the user or rider to utilize the same frame 34 and other components for both the wheeled cycle or configuration, and the tracked cycle or configuration, thus saving the cost of having purchase two different vehicles. As stated above, the track assembly 22 can be provided on the frame 34 for a dedicated tracked vehicle 18.

In addition, the bogie wheel 68 and compliant and resilient arms 80 facilitate use of the track assembly 22 or tracked vehicle 18 on the riding surface 30, such as snow, mud, sand, etc. The arms 80 exert a force against the bogie wheel 68 to maintain the track 60 or flat portion 72 thereof against the riding surface 30.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A kit for converting a standard bicycle into a tracked cycle, the kit comprising:

a) a drive wheel configured to be coupled to a frame of the standard bicycle, and configured to be operatively coupled to a drive of the standard bicycle;

b) a flexible and resilient arm having a first end configured to be coupled to the frame of the standard bicycle, and a second end configured to extend rearward from the frame;

c) a bogie wheel, coupled to the second end of the arm and located rearward of the drive wheel; and d) a continuous track, movably disposed around the drive and bogie wheels;

e) the arm being formed of a flexible and resilient material configured to bias the bogie wheel and track towards a riding surface; and f) the arm attaching the bogie wheel to the frame in a cantilever configuration.

2. A kit in accordance with claim 1, wherein the arm includes a composite material.

3. A kit in accordance with claim 1, wherein the arm provides between approximately 5–25 pounds of force between approximately 1–3 inches of deflection.

4. A kit in accordance with claim 1, wherein the arm is bent into a curved configuration when the ski and track align with one another on a riding surface such that the arm is preloaded.

5. A kit in accordance with claim 1, wherein the bogie wheel pivots with respect to the frame, and the arm is bendable as the bogie wheel pivots.

6. A kit in accordance with claim 1, further comprising:
a) a frame bracket, attached to the arm opposite the bogie wheel, configured to attach the arm to the frame.

7. A kit in accordance with claim 1, further comprising:
a) a tension mechanism, coupled to the bogie wheel, to tension the track, including:
i) bogie bracket, attached to the flexible arm;
ii) a pivot bar having a first end pivotally attached to the bogie bracket, and a second end coupled to the bogie wheel, the pivot bar being pivotal towards and away from the frame; and
iii) the pivot bar being biased away from the frame to tension the track.

8. A kit in accordance with claim 1, further comprising:
a) a ski configured to be coupled to a front fork of the standard bicycle.

9. A human powered vehicle apparatus having both wheeled and tracked configurations, comprising:
a) a frame having a seat and a rear fork;
b) a front fork and a handle bar, attached to one another and pivotally coupled to the frame;
c) a drive assembly, coupled to the frame, including:
i) a peddle gear, rotatably coupled to the frame, having peddles to turn the peddle gear; and
ii) a drive chain, movably disposed around the peddle gear;
d) a rear wheel, removably attachable to the rear fork of the frame, and operatively attachable to the drive chain;
e) a front wheel, removably attachable to the front fork of the frame;
f) a track assembly, removably attachable to the frame, including:
i) a drive wheel, removably attachable to the rear fork of the frame, having a drive gear operatively attachable to the drive chain;
ii) a bogie wheel, located rearward of, and spaced apart from, the drive wheel and movably attachable to the frame;
iii) a continuous track, movably disposed around the drive and bogie wheels; and
iv) a pair of flexible and resilient arms, coupled to and between the frame and the bogie wheel on opposite sides thereof, configured to bias the bogie wheel and track towards a riding surface; and g) a ski, removably attachable to the front fork; and h) the apparatus having at least two configurations, including:
i) a wheeled configuration in which the rear wheel is coupled to the rear fork and in which the track assembly is uncoupled from the frame; and
ii) a tracked configuration in which the track assembly is coupled to the frame and the rear wheel is uncoupled from the rear fork.

10. An apparatus in accordance with claim 9, wherein the arms include a composite material.

11. An apparatus in accordance with claim 9, wherein the arms form springs.

12. An apparatus in accordance with claim 9, wherein the arms provide between approximately 5–25 pounds of force between approximately 1–3 inches of deflection.

13. An apparatus in accordance with claim 9, wherein the arms are bent into a curved configuration when the ski and track align with one another on a riding surface such that the arms are preloaded.

14. An apparatus in accordance with claim 9, wherein the bogie wheel pivots with respect to the frame, and the arms are bendable as the bogie wheel pivots.

15. An apparatus in accordance with claim 9, wherein the drive wheel is coupled to a rear axle location of the frame.

16. An apparatus in accordance with claim 9, wherein:
a) the wheeled configuration further includes the front wheel coupled to the front fork and the ski uncoupled from the front fork; and
b) the tracked configuration further includes the ski coupled to the front fork and the front wheel uncoupled from the front fork.

17. An apparatus in accordance with claim 9, wherein the track assembly further includes:
a) a frame bracket, removably attachable to the frame;
b) an upper brace, adjustably attached to the frame bracket, receiving an upper member of the rear fork of the frame between the upper brace and the frame bracket;
c) a lower brace, adjustably attached to the frame bracket, receiving a lower member of the rear fork of the frame between the lower brace and the frame bracket.

18. An apparatus in accordance with claim 9, wherein the track assembly further includes:
a) a tension mechanism to tension the track, including:
i) a bogie bracket, attached to one of the flexible arms opposite the frame, having an extension extending rearward;
ii) a pivot bar having a first end pivotally attached to the bogie bracket, and a second end coupled to the bogie wheel, the pivot bar being pivotable towards and away from the frame; and
iii) a spring, coupled to and between the extension of the bogie bracket and the second end of the pivot bar, to pull the pivot bar away from the frame and tension the track.

19. An apparatus in accordance with claim 9, wherein the track assembly further includes:
a) a brake disc, attached to the drive wheel.

20. An apparatus in accordance with claim 9, wherein the ski further includes:
a) a ski post, removably attachable to the front fork, including:
i) a lower mounting bracket, attachable to a front axle location of the front fork;
ii) an upper mounting bracket, attachable to the front fork; and iii) a connector on a lower end of the post pivotally coupled to the ski.

21. An apparatus in accordance with claim 9, wherein the track assembly further includes:
    a) a plurality of teeth formed on the drive wheel;
    b) a plurality of apertures formed in the track to receive the teeth therein as the track and drive wheel rotate.

22. An apparatus in accordance with claim 21, wherein the teeth have an involute profile.

23. A kit for converting a standard bicycle into a tracked cycle, the kit comprising:
    a) a drive wheel configured to be coupled to a frame of the standard bicycle, and configured to be operatively coupled to a drive of the standard bicycle;
    b) a flexible and resilient arm having a first end configured to be coupled to the frame of the standard bicycle, and a second end configured to extend rearward from the frame;
    c) a bogie wheel, coupled to the second end of the arm and located rearward of the drive wheel; and
    d) a continuous track, movably disposed around the drive and bogie wheels;
    e) the arm being formed of a flexible and resilient material configured to bias the bogie wheel and track towards a riding surface; and
    f) a frame bracket, attached to the arm opposite the bogie wheel, configured to attach the arm to the frame.

24. A kit in accordance with claim 23, wherein the arm includes a composite material.

25. A kit in accordance with claim 23, wherein the arm attaches the bogie wheel to the frame in a cantilever configuration.

26. A kit in accordance with claim 23, wherein the arm provides between approximately 5–25 pounds of force between approximately 1–3 inches of deflection.

27. A kit in accordance with claim 23, wherein the arm is bent into a curved configuration when the ski and track align with one another on a riding surface such that the arm is preloaded.

28. A kit in accordance with claim 23, wherein the bogie wheel pivots with respect to the frame, and the arm is bendable as the bogie wheel pivots.

29. A kit in accordance with claim 23, further comprising:
    a) a tension mechanism, coupled to the bogie wheel, to tension the track, including:
       i) a bogie bracket, attached to the flexible arm;
       ii) a pivot bar having a first end pivotally attached to the bogie bracket, and a second end coupled to the bogie wheel, the pivot bar being pivotal towards and away from the frame; and
       iii) the pivot bar being biased away from the frame to tension the track.

30. A kit in accordance with claim 23, further comprising:
    a) a ski configured to be coupled to a front fork of the standard bicycle.

31. A kit for converting a standard bicycle into a tracked cycle, the kit comprising:
    a) a drive wheel configured to be coupled to a frame of the standard bicycle, and configured to be operatively coupled to a drive of the standard bicycle;
    b) a flexible and resilient arm having a first end configured to be coupled to the frame of the standard bicycle, and a second end configured to extend rearward from the frame;
    c) a bogie wheel, coupled to the second end of the arm and located rearward of the drive wheel; and
    d) a continuous track, movably disposed around the drive and bogie wheels;
    e) the arm being formed of a flexible and resilient material configured to bias the bogie wheel and track towards a riding surface; and
    f) a tension mechanism, coupled to the bogie wheel, to tension the track, including:
       i) a bogie bracket, attached to the flexible arm;
       ii) a pivot bar having a first end pivotally attached to the bogie bracket, and a second end coupled to the bogie wheel, the pivot bar being pivotal towards and away from the frame; and
       iii) the pivot bar being biased away from the frame to tension the track.

32. A kit in accordance with claim 31, wherein the arm includes a composite material.

33. A kit in accordance with claim 31, wherein the arm attaches the bogie wheel to the frame in a cantilever configuration.

34. A kit in accordance with claim 31, wherein the arm provides between approximately 5–25 pounds of force between approximately 1–3 inches of deflection.

35. A kit in accordance with claim 31, wherein the arm is bent into a curved configuration when the ski and track align with one another on a riding surface such that the arm is preloaded.

36. A kit in accordance with claim 31, wherein the bogie wheel pivots with respect to the frame, and the arm is bendable as the bogie wheel pivots.

37. A kit in accordance with claim 31, further comprising:
    a) a frame bracket, attached to the arm opposite the bogie wheel, configured to attach the arm to the frame.

38. A kit in accordance with claim 31, further comprising:
    a) a ski configured to be coupled to a front fork of the standard bicycle.

39. A human powered vehicle apparatus having both wheeled and tracked configurations, comprising:
    a) a frame having a seat and a rear fork;
    b) a front fork and a handle bar, attached to one another and pivotally coupled to the frame;
    c) a drive assembly, coupled to the frame, including:
       i) a peddle gear, rotatably coupled to the frame, having peddles to turn the peddle gear; and
       ii) a drive chain, movably disposed around the peddle gear;
    d) a rear wheel, removably attachable to the rear fork of the frame, and operatively attachable to the drive chain;
    e) a front wheel, removably attachable to the front fork of the frame;
    f) a track assembly, removably attachable to the frame, including:
       i) a drive wheel, removably attachable to the rear fork of the frame, having a drive gear operatively attachable to the drive chain;
       ii) a bogie wheel, located rearward of, and spaced apart from, the drive wheel and movably attachable to the frame; and
       iii) a continuous track, movably disposed around the drive and bogie wheels; and
    g) a ski, removably attachable to the front fork; and
    h) the apparatus having at least two configurations, including:
       i) a wheeled configuration in which the rear wheel is coupled to the rear fork and in which the track assembly is uncoupled from the frame; and
       ii) a tracked configuration in which the track assembly is coupled to the frame and the rear wheel is uncoupled from the rear fork.

\* \* \* \* \*